Aug. 7, 1945.   D. I. BOHN   2,381,637
ARC QUENCHER
Filed April 9, 1942   4 Sheets-Sheet 1

INVENTOR.
DONALD I. BOHN
BY
ATTORNEY.

Aug. 7, 1945.                D. I. BOHN                 2,381,637
                            ARC QUENCHER
              Filed April 9, 1942           4 Sheets-Sheet 3

INVENTOR.
DONALD I. BOHN
BY
    ATTORNEY.

Aug. 7, 1945.   D. I. BOHN   2,381,637
ARC QUENCHER
Filed April 9, 1942   4 Sheets-Sheet 4

INVENTOR.
DONALD I. BOHN
BY
ATTORNEY.

Patented Aug. 7, 1945

2,381,637

UNITED STATES PATENT OFFICE

2,381,637

ARC QUENCHER

Donald I. Bohn, Pittsburgh, Pa., assignor to I-T-E Circuit Breaker Company, Philadelphia, Pa., a corporation of Pennsylvania Application April 9, 1942, Serial No. 438,231

5 Claims. (Cl. 200—147)

My present invention relates to arc quenching devices and more particularly to a magnetic blow-out device which will cause an intense magnetic flux around an initial arc of high current value and which will introduce additional flux generating turns as the increase in arc resistance decreases the arc current value.

Various electrical circuits have properties which require that the protective apparatus have special characteristics in order that temporary or permanent faults may be prevented from causing serious damage, and in order that any disturbance may be localized.

This is particularly true of those circuit interrupters which are utilized for the protection of the anode circuits of mercury arc rectifiers supplying direct current power to a system connected to other generative apparatus.

Mercury arc rectifiers are subject to internal faults which will permit a backward flow of power through the rectifier from the direct current system.

Since such a fault may be destructive, it is essential that the interrupter in the affected branch of the circuit cut off the fault current flow in the shortest possible time after its inception. Such apparatus requires a high speed current responsive device such as that disclosed in application Serial No. 381,817 of Bohn and a quick acting contact mechanism and arc quenching structure as shown in application Serial No. 373,051 of Scott.

The present invention covers an arc quenching structure particularly suitable to the special type of circuit involved.

Under normal conditions the current flowing through the anode of a mercury arc rectifier is a uni-directional half-wave current of the alternating current supply. This produces a high value of magnetizing force once every cycle.

The magnetic blow-out device must, therefore, carry a normal load of pulsating current and at the same time be able to extinguish an arc of direct current having a relatively high rate of rise.

The first of these conditions tends to generate heat in magnetic members used in the structure, while the second requires that the maximum field strength be provided in accordance with the usual practice in high speed direct current circuit breakers.

The present invention is an improvement over the arc quencher of the type shown in application Serial No. 373,051 of Scott where the arc quencher may be readily removed for the inspection of contacts.

Broadly, my invention contemplates a novel tandem arrangement of arc blow-out devices, which are sequentially rendered operative to pick up the arc from the preceding blow-out and further extend the arc to the next succeeding blow-out device until the arc has been sufficiently extended to extinguish.

In the present invention a pair of coils of relatively small diameter is rigidly mounted on either side of the arc chute and is connected in series with the circuit breaker contacts.

A second pair of coils of relatively large diameter is secured to the sides of the arc chute and is movable therewith when it is swung to one side for contact inspection.

Releasable means are provided for connecting the second pair of coils in circuit when the arc chute is in the operative position. These coils normally carry no current.

During contact separation the first pair of coils produces a magnetic field which moves the arc from the contacts to the arcing horns. As the arc approaches the upper branch of the first set of coils, one of its terminals is transferred from the arcing horn to an electrode which disconnects the upper branch of the main coils and connects the secondary coils in the circuit.

These latter coils move the arc up through the chute and cause it to be extinguished.

The initial movement of the arc is, therefore, caused by a series of turns of relatively low impedance and producing a high flux density around the contacts. The final movement of the arc is caused by a coil of relatively high impedance which is automatically switched into the circuit by the movement of the arc. This switching action cuts out the part of the main coil which would at this time produce a retarding flux during further movement of the arc.

An object of the present invention, therefore, is to provide in a circuit interrupter an arc quenching device that will be effective quickly to extinguish either alternating pulsating or direct current arcs.

A further object is to provide a magnetic blow-out device which, during normal current loads, will not produce excessive temperatures or noise.

It is an important object of the present invention to provide an arc extinguishing device that will cause an intense magnetic flux around an initial arc of high current value and to introduce additional flux generating turns as the increase in arc resistance decreases the arc current value.

Another object of the present invention is to provide in a magnetic blow-out device means by which the arc terminals are transferred from the main current carrying contacts to the arcing horns without any substantial change in the inductance of the circuit and to increase the strength of the magnetic field.

A further object of the invention is to provide for an arc extinguisher a coil of relatively small diameter for producing a magnetic field of high intensity around the separable contacts and to provide means for preventing the field of this coil from retarding the movement of the arc as the arc moves beyond its periphery.

These and many other objects of my invention will become apparent in the following description and drawings in which.

In each of the drawings there is illustrated the electrical circuits used in producing a magnetic field to force an arc into an extinguishing chamber.

Figure 1:
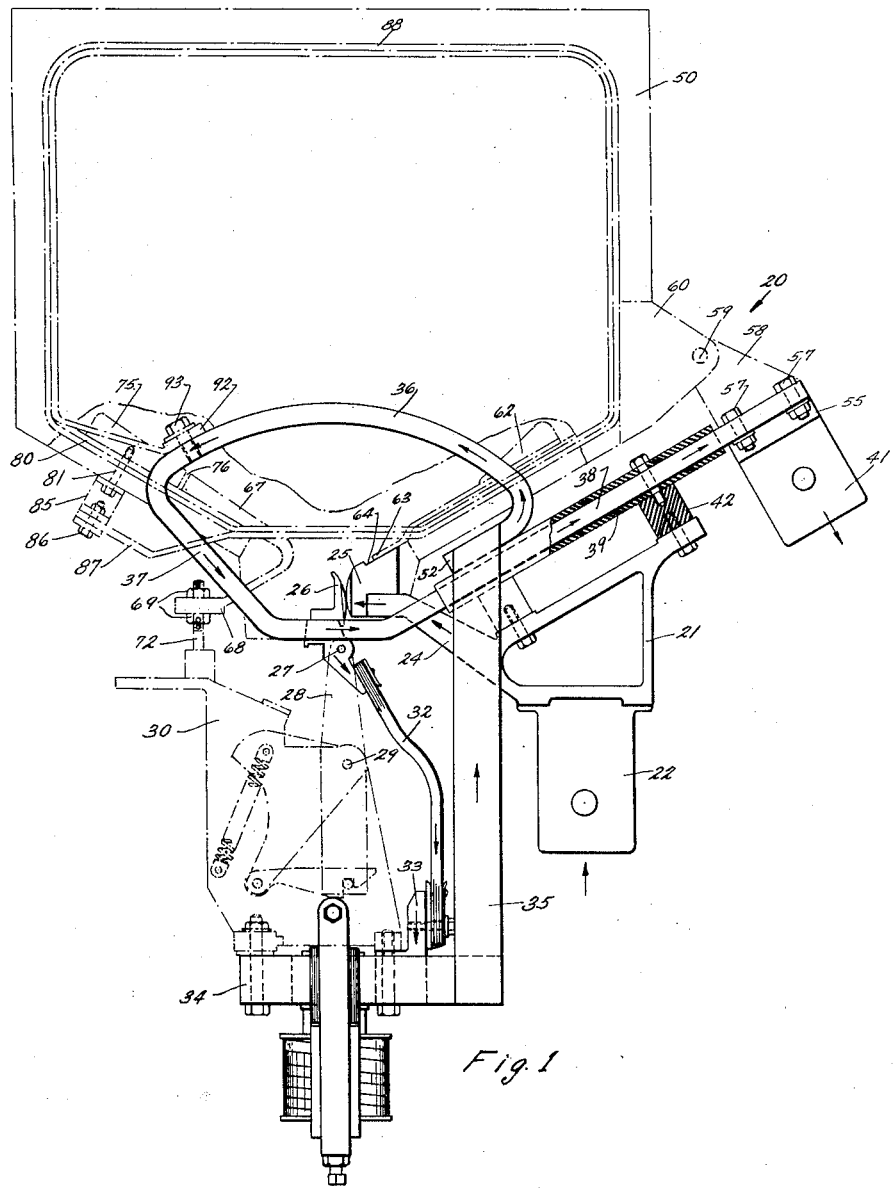
Figure 1 is a schematic cross-sectional view of a circuit breaker having my magnetic blow-out device with the contacts closed in condition for carrying its normal current load, the current path being shown by the solid line members.
Figure 2:
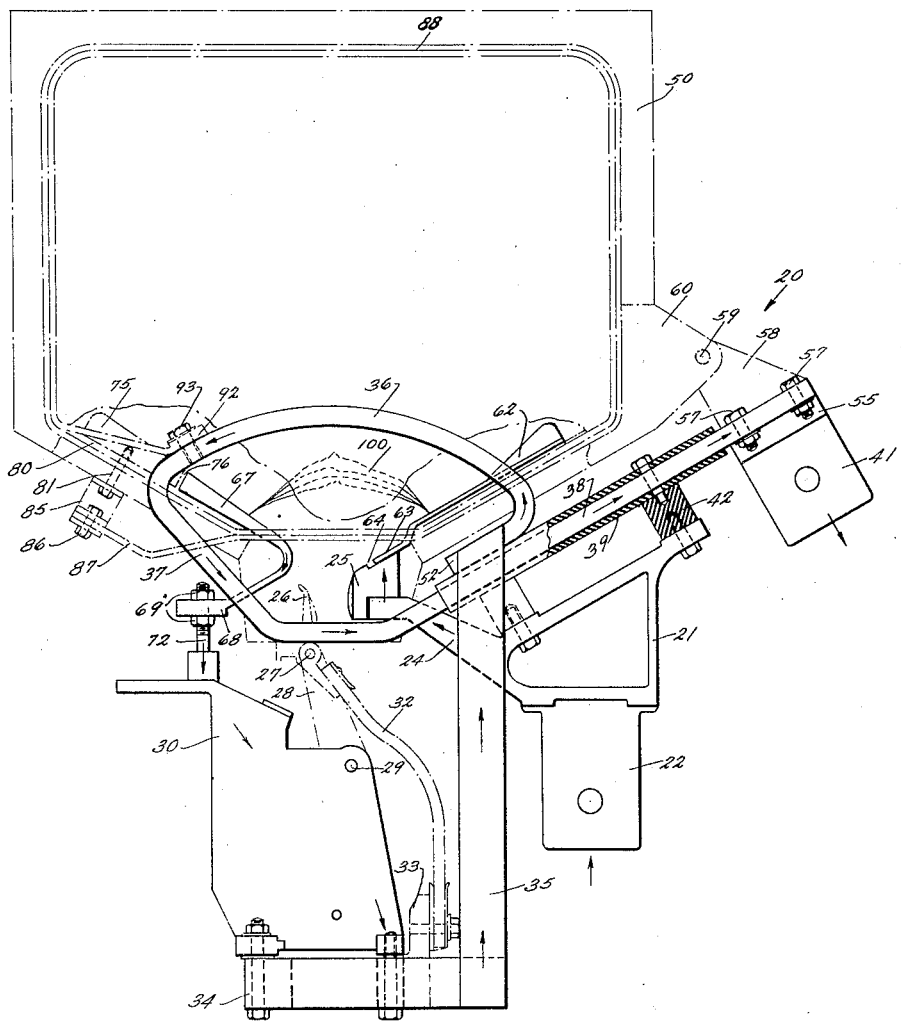
Figure 2 is a view corresponding to that of Figure 1 showing the circuit breaker, however, immediately after the contacts have been opened and the arc transferred to the arcing horn. The current path through the mechanism is again shown by the solid lines.
Figure 3:
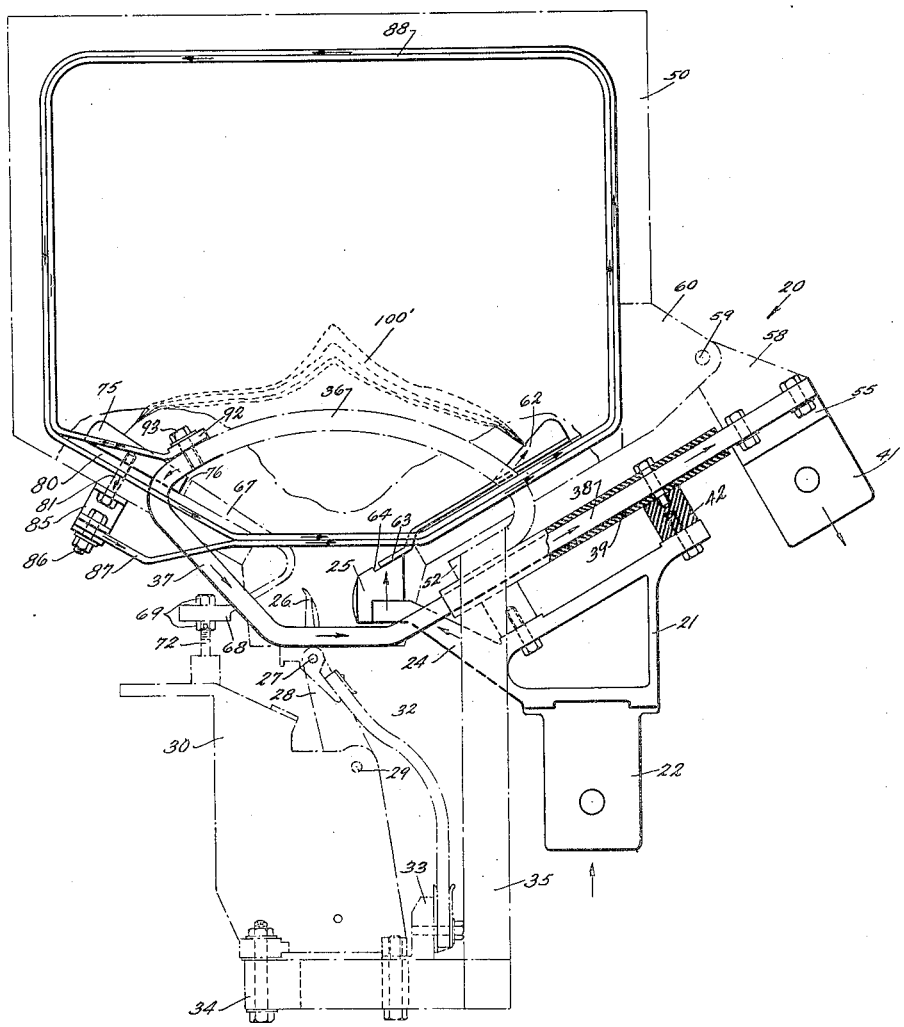
Figure 3 is a view corresponding to that of Figures 1 and 2, showing the circuit breaker with the contacts open and the arc having progressed further in the arc chute. Again the current paths are shown in solid lines.

Figures 1 to 3 show the circuit breaker partly in section with the parts which are carrying current drawn in solid lines while those parts which are not carrying current at the instant shown are in dotted lines.

Much of the operating mechanism and associated parts have been omitted for clarity. These members are shown in Scott application Ser. No. 373,051 and reference is made thereto for additional showing of other portions of the circuit breaker.

Referring now to Figure 1, there is here shown a circuit breaker 20 having a cast terminal 21 which is utilized to support certain parts of the circuit breaker structure in a manner more specifically described in Scott application Ser. No. 373,051 which members, however, are not specifically pertinent to the present disclosure.

The terminal 21 carries a lug 22 from which a connection may be made to one leg of the external circuit.

The cast terminal 21 is also provided with an extension 24 to which is secured the main stationary contact 25. A movable contact 26 is supported on the pivot 27 by an operating arm 28 which in turn rotates about the pin 29 in the stationary housing 30.

The manner of operation of the movable contact 26 and its operating arm 29 is more specifically shown in the aforementioned application Serial No. 373,051 of Scott.

Obviously, when the circuit breaker is closed, movable contact 26 is in surface to surface current carrying engagement with the stationary contact 25 so that current will flow from one leg of the circuit into the terminal 22 through the terminal casting 21, then through the supporting member 24 to the stationary circuit breaker contact 25, then through the movable contact 26 and through its flexible conductor 32 to the trip coil terminal 33. The current then flows through a standard trip coil 34 (schematically illustrated) to the risers 35 to the upper branch 36 of the main blow-out coils.

The current then continues to flow around these coils, through the lower branch 37 and through the bars 38 which, at their ends 40 are secured to the lug 41 which may be connected to the opposite leg of the external circuit.

The bars 38 are surrounded by a sleeve 39 of insulating material and are supported by the terminal casting 21 being spaced therefrom by the insulating members 42.

Figure 4:
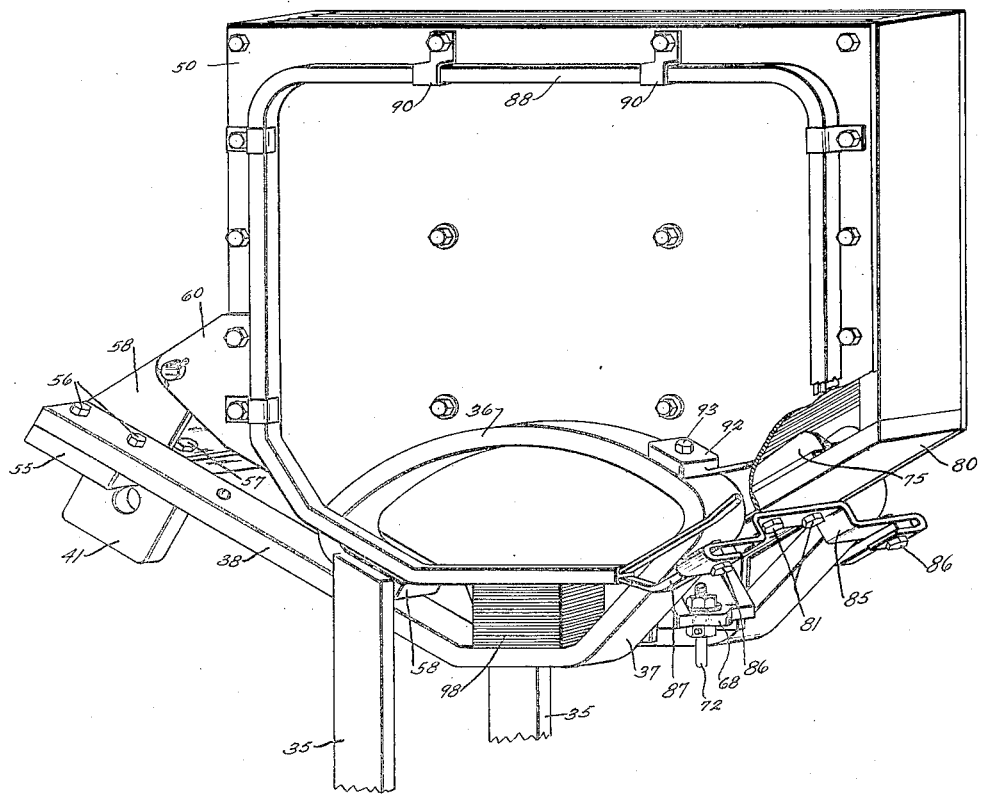
Figure 4 is a view in perspective of the magnetic blow-out coils and the arc chute partly in section.

Since it is necessary that the main blow-out coil be placed on each side of the arc chute 50, the current from the trip coil 34 is divided into two risers 35, as is seen more particularly in Figure 4, which are each connected to a corresponding coil 36—37.

Each of the risers 35 may, as seen in Figure 4, be connected to the end 52 of its respective coil 36 in any suitable manner. Thus, it may be welded thereto, or bolted thereto in such manner that an efficient current carrying joint is formed therebetween.

The juncture between the two bars 38 at their outer end may be effected, as seen in Figure 4, by a cross plate 55 to which each of the bars 38 is secured in any suitable current carrying manner, as for instance by the bolts 56, 56.

The connecting lug 41 is secured to the cross plate 55 as seen in Figures 1 and 4 by means of bolts 57, 57 passing through flanges in the lug 41.

A bracket 58 is secured to each of the outer ends of the bars 38 also in any suitable manner, as for instance by welding or bolts.

Each bracket 58 is provided with a pin 59 engaging a clevis 60 which is secured to the arc chute. The clevis 60 obviously constitutes two plates, one secured to each side of the arc chute with the pin 59 passing therebetween and engaging the brackets 58 on each side.

By this means the entire arc chute 50 can be rotated about the pin 59 clockwise with respect to Figures 1, 2 and 3, and counterclockwise with respect to Figure 4, so that the circuit breaker contacts may be exposed for inspection.

The right hand side (with respect to Figures 1, 2 and 3) of the lower part of the arc chute, that is the side thereof closest to the stationary contact 25 is provided with an arcing horn 62 which carries a resilient extension 63 which in turn engages the ledge 64 of the stationary contact block 25.

Thus, when the arc chute is in its operative position with respect to the circuit breaker contacts, the arcing horn 62 is in electrical contact with the circuit.

The opposite side of the arc chute 50, (that is the side thereof which is most closely adjacent to the movable contact 26) is provided at its lower end with an arcing horn 67 having a lower extension 68 which is held in position by the nuts 69, 69 threaded on the stud 72 secured to the top of the stationary housing 30.

When the nuts 69, 69 are pulled tight, the arc chute is rigidly supported in place. The removal of the upper nut 69 permits the release of the left hand end (with respect to Figure 1) of the arc chute so that the arc chute may then be rotated about the pin 59, thus exposing the contacts for inspection.

An electrode 75 is also provided on the left hand side of the lower portion of the arc chute. This electrode extends in substantially the same plane as the arcing horn 67 but is separated therefrom by an appreciable air gap 76.

Since arcing horn 67 and electrode 75 are supported by the insulating base 80 of the arc chute 50 they are adequately insulated from each other.

A pair of screws 81, 81 are threaded into the electrode 75. These screws, as seen more particularly in Figure 4, secure a bracket 85 to the lower insulating member 80 of the arc chute.

The outside ends of the bracket 85 are secured by the screws 86, 86 to one end 87 of each of the two turn secondary blow out coils 88 on each side.

One such secondary blow out coil 88 is provided on each side of the arc chute 50 and is secured thereto in any suitable manner as, for instance, by the clamping brackets 90, 90.

The secondary blow out coils 88 have dimensions which are approximately the same as those of the outside of the arc chute and are thus supported directly by the side of the arc chute itself.

The opposite or inner end 92 of this secondary coil 88 is secured to the upper turn 36 of the main blow out coil by the bolt 93. Thus, when it is desired to rotate the arc chute 50 about the pin 59, it is necessary not only to release the upper nut 69, but also to release the bolt 93 on each side of the arc chute.

The various current paths through the device for different conditions in the circuit breaker contacts are shown in Figures 1, 2 and 3.

In Figure 1, the solid lines indicate the current path through the device when the circuit breaker contacts are closed—that is, when the main movable contact 26 is in engagement with the main stationary contact 25.

To recapitulate, current enters from an external leg of the circuit, through the lug 22, the terminal casting 21, the extension 24 to the stationary contact 25. Thence, current flows to the movable contact 26 through the lead 32 to the terminal 33 of the trip coil 34, thence through the risers 35, the upper branch 36 of the main blow out coil, the lower branch 37 thereof, to the bars 38, thence through the plate 55 and the connecting lug 41 to the opposite leg of the circuit.

In Figure 2, I have shown the condition of the circuit breaker just after it has been opened and the magnetic field of the main coil 36-37 has forced the arc from the main contacts 25 and 26 to the arcing horn extension 63 and the opposite arcing horn 67.

The transfer of the arc from the moving contact 26 to the arcing horn 67 is facilitated by the fact that the current coil 34 is electrically connected to the housing 30. This in turn is in contact by means of the stud 72 with the arcing horn 67.

The parts carrying the current in Figure 2 are again shown in solid lines.

The current will now flow from the lug 22 to the terminal casting 21, thence from the extension 24 to the stationary contact 25, then through arcing horn extension 63, through the arc 100 to the arcing horn 67.

Current will then flow through the arcing horn extension 68 to the stud 72, thence through housing 30, then to the coil 34 and thence to the vertical risers 35 to the main blow out coil 36—37, thence to the bars 38 and the connection lug 41.

The flux generated by the current flowing in the main blow out coil 36, and in the arc, blows the arc steadily upwards until its left hand terminal (with respect to Figures 1, 2, and 3) is forced across the air gap 76 and comes into contact with the electrode 75. This condition is shown in Figure 3.

Here again the parts carrying current are drawn in solid lines while those not carrying current are drawn in dotted lines.

The course of current is now from the lug 22 to the terminal casting 21, the extension 24, and the stationary contact 25, through the extension 63 of the arcing horn 62 to the arcing horn 62, then across the arc 100' to the electrode 75. From the electrode, current then flows through the screws 81 to the bracket 85 then through the screws 86 on each side of the bracket to the end 87 of the secondary blow-out coils 88 on each side of the arc chute 50. Coils 88 are preferably wrapped with insulating material.

Current then flows through the coils 88 to the opposite ends 92 thereof secured by the bolt 93 to the upper branch 36 of the main blow-out coil on each side of the arc chute. Current, however, continues only through the lower branch 37 of the main blow-out coil to the bars 38 and to the circuit connecting lug 41.

It is, therefore, seen that during the initial circuit interruption the main blow out coil produces an intense magnetic field about the separable contacts. This transfers the arc to the arcing horn and moves it upwards. As the arc is blown to the upper portion of turn 36 of the main blow out coil the movement of the terminal of the arc from the arcing horn 67 to the electrode 75 cuts out the current flow in the upper branch 36 of the main blow-out coil and switches in the secondary blow-out coil 88. If this were not done, the reversed flux about the upper branch 36 of the main blow-out coil would tend to retard the movement of the arc.

The secondary blow-out coil 88 is then able to force the arc up through the arc chute and causes its extinction.

Various modifications in the construction and operation of the device herein disclosed may be made without departing from the principles herein set forth.

Thus, in order to provide a particularly powerful flux concentration around the separable contacts, a magnetic element 98 (Figure 4) may be employed within the main blow-out coil 36—37 on each side of the arc chute.

This element 98 is preferably constructed of thin laminations of magnetic material so that there is relatively little heat generation at this point when the circuit breaker is carrying its normal load.

The fact that the main blow-out coil is always in series with the circuit breaker contacts when the circuit breaker is closed ensures that the magnetic blow-out flux will be generated immediately upon the inception of the opening of the contacts.

Thereafter, when the contacts have opened and an arc has been struck therebetween, the magnetic flux generated by the main blow-out coil is immediately operated to force the arc up and to the arcing horns.

The arc, when struck and while it is moving upwardly at the lower part of the arcing horns, is also in series with the main blow-out coil.

Thus while the resistance of the arc is lowest, the main blow-out coil is still effective to drive it upwardly.

As the arc is further moved upwardly and attenuated so that its resistance is substantially increased and further as it moves beyond the upper portion 36 of the main blow-out coil this portion of the main blow-out coil is disconnected and a secondary blow-out coil 88 of greater extent is connected in series with the arc to blow it further into the arc extinguisher.

The initial arc extinguishing impulse or arc moving impulse is caused by a powerful magnetic flux produced by the current flowing in a coil of relatively low resistance and connected in the circuit at the time the current in the coils is at its maximum.

Since current in this coil would act to retard the movement of the arc, once it is moved beyond the periphery thereof, this coil is disconnected as soon as such movement has occurred.

Furthermore, since coil 36—37 is connected in series with the circuit breaker contacts when the circuit breaker is closed, it is important that this coil have the lowest resistance consistent with effective operation; and hence, as seen in the figures, this coil preferably consists of a bar of suitable conductive material of appropriate cross-section for the particular current density which it is to withstand and bent into appropriate coil formation.

Since various modifications and variations in the device within the aforementioned principles should now be obvious to those skilled in the art, I prefer to be bound, not by the specific disclosures set forth above, but only by the appended claims.

I claim:

1. In a circuit breaker having a movable and a complementary contact between which an arc is drawn, an arc chute, a plurality of blow-out coils for moving the arc into said arc chute; one of said blow-out coils being located in the region of and adjacent to said contacts; another of said blow-out coils having a portion extending remote from said contacts and substantially over the area defined by said arc chute; and means for successively placing said blow-out coils in circuit and for successively taking portions of said blow-out coils out of circuit.

2. In a circuit breaker having a movable and a complementary contact between which an arc is drawn, an arc chute, a plurality of blow-out coils for moving the arc into said arc chute; one of said blow-out coils being located in the region of and adjacent to said contacts; another of said blow-out coils having a portion extending remote from said contacts and substantially over the area defined by said arc chute; and means for successively placing said blow-out coils in circuit and for successively taking portions of said blow-out coils out of circuit, the arc comprising a portion of said last mentioned means.

3. In a circuit breaker having a movable and a complementary contact between which an arc is drawn, an arc chute, a plurality of blow-out coils for moving the arc into said arc chute; one of said blow-out coils being located in the region of and adjacent to said contacts; another of said blow-out coils having a portion extending remote from said contacts and substantially over the area defined by said arc chute; and means for successively placing said blow-out coils in circuit and for successively taking portions of said blow-out coils out of circuit, the blow-out coil in the region of the contacts having a higher current carrying capacity than the blow-out coil in the region of the arc chute to form a strong magnetic field to drive the arc into the arc chute; a portion of said first mentioned blow-out coil being taken out of circuit when said second mentioned blow-out coil is energized.

4. In a circuit breaker having a movable and a complementary contact between which an arc is drawn, an arc chute, a plurality of blow-out coils for moving the arc into said arc chute; one of said blow-out coils being located in the region of and adjacent to said contacts; another of said blow-out coils having a portion extending remote from said contacts and substantially over the area defined by said arc chute; and means for successively placing said blow-out coils in circuit and for successively taking portions of said blow-out coils out of circuit, the blow-out coil in the region of the contacts having a higher current carrying capacity than the blow-out coil in the region of the arc chute to form a strong magnetic field to drive the arc into the arc chute; a portion of said first mentioned blow-out coil being taken out of circuit when said second mentioned blow-out coil is energized, said second mentioned blow-out coil having a portion in common with a portion of said first mentioned blow-out coil.

5. In a circuit breaker having a movable and a complementary contact between which an arc is drawn, an arc chute, a plurality of blow-out coils for moving the arc into said arc chute; one of said blow-out coils being located in the region of and adjacent to said contacts; another of said blow-out coils having a portion extending remote from said contacts and substantially over the area defined by said arc chute; and means for successively placing said blow-out coils in circuit and for successively taking portions of said blow-out coils out of circuit, the arc comprising a portion of said last mentioned means, the blow-out coil in the region of the contacts having a higher current carrying capacity than the blow-out coil in the region of the arc chute to form a strong magnetic field to drive the arc into the arc chute; a portion of said first mentioned blow-out coil being taken out of circuit; when said second mentioned blow-out coil is energized; said second mentioned blow-out coil having a portion in common with a portion of said first mentioned blow-out coil, said common portion being connected to one terminal of said circuit breaker; an arcing horn in said arc chute, said arcing horn being divided into segments; one segment being connected to a terminal of said first blow-out coil opposite said common portion; another segment being connected to a terminal of said second blow-out coil opposite said common portion; the arc as it moves from one segment to the other of said arcing horn placing in circuit the coil portions connected to the particular segment on which the arc root rests and taking out of circuit the coil portions connected to the particular segment not engaged by the arc root.

DONALD I. BOHN.